(12) United States Patent
Castelli et al.

(10) Patent No.: US 6,993,458 B1
(45) Date of Patent: Jan. 31, 2006

(54) METHOD AND APPARATUS FOR PREPROCESSING TECHNIQUE FOR FORECASTING IN CAPACITY MANAGEMENT, SOFTWARE REJUVENATION AND DYNAMIC RESOURCE ALLOCATION APPLICATIONS

(75) Inventors: Vittorio Castelli, Croton-on-Hudson, NY (US); Peter A. Franaszek, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 09/706,737

(22) Filed: Nov. 7, 2000

(51) Int. Cl.
G06F 11/30 (2006.01)

(52) U.S. Cl. .................. 702/186; 702/186; 702/69; 702/73; 702/81; 370/516; 375/226; 375/227; 708/5; 708/400

(58) Field of Classification Search ............... 702/17, 702/69–71, 79, 81, 176, 179, 186–195, 73; 370/516; 375/226, 227; 708/5, 400; 327/551; 367/43; 324/76.44; 340/310.03
See application file for complete search history.

(56) References Cited

U.S. PATENT DOCUMENTS

| | | | | |
|---|---|---|---|---|
| 4,438,519 A * | 3/1984 | Bose | ................ | 375/139 |
| 5,764,686 A * | 6/1998 | Sanderford et al. | ......... | 375/149 |
| 5,960,097 A * | 9/1999 | Pfeiffer et al. | .............. | 382/103 |
| 6,159,690 A * | 12/2000 | Borrebaeck et al. | ........... | 435/6 |
| 6,259,677 B1 * | 7/2001 | Jain | ........................... | 370/252 |
| 6,549,804 B1 * | 4/2003 | Osorio et al. | ............... | 600/544 |
| 6,574,587 B2 * | 6/2003 | Waclawski | .................. | 702/186 |
| 6,625,569 B2 * | 9/2003 | James et al. | ................ | 702/183 |
| 6,641,541 B1 * | 11/2003 | Lovett et al. | .............. | 600/508 |
| 2004/0071363 A1 * | 4/2004 | Kouri et al. | ................ | 382/276 |

OTHER PUBLICATIONS

Selesnick, 'The Slantlet Transform', May 1999, IEEE Article, vol. 47, No. 5, pp. 1304-1313.*
Shurlock et al., 'Numverical Weather Prediction: Two Dimensional grid point variation analysis', Aug. 2004, NWP Publication, Report No. 108, pp. 1-12.*
Green et al., 'Algorithms for Filtering of Market Price Data', Mar. 1997, IEEE Publication, pp. 227-231.*
E.L. Lehmann "Theory of Point Estimation", John Wiley & Sons, NY , 1983, pp. 84-447.
T.W. Anderson, "The Statistical Analysis of Time Series", 1971, John Wiley & sons, NY, pp. 414-425.
Ingrid Daubechies, "Ten Lectures on Wavelets", Society for Industrial and Applied Mathematics, Philadelphia, Pennsylvania 1992, pp. vii-16.
N.G. Duffield, et al., "A Flexible Model for Resource Management in Virtual Private Networks", SIGCOMM '99 Aug. 1999 Cambridge, MA, USA, pp. 95-108.

(Continued)

Primary Examiner—Marc S. Hoff
Assistant Examiner—Elias Desta
(74) Attorney, Agent, or Firm—E. Dwayne Nelson, Esq.; McGinn IP Law Group, PLLC

(57) ABSTRACT

A system and method preprocesses data, in a computer system where forecasting of computing resources is performed based on past and present observations of measurements related to the resources. The preprocessing includes decomposing the past and present observations into a smooth time sequence, a jump time sequence, a noise time sequence and a spike time sequence. The method (and system) includes detecting the spikes in a signal representing the measurements, detecting the jumps in the signal, removing spikes and jumps from the signal, and removing the noise from the signal, to obtain a smooth version of the signal.

30 Claims, 14 Drawing Sheets

OTHER PUBLICATIONS

David L. Donoho, "De-Noising by Soft-Thresholding", IEEE Transactions on Information Theory, vol. 41, No. 3, May 1995, pp. 613-627.

Joseph M. Francos, "Bounds on the Accuracy of Estimating the Parameters of Discrete Homogeneous Random Fields with Mixed Spectral Distributions", IEEE Transactions on Information Theory, vol. 43, No. 3, May 1997, pp. 908-922.

Sachin Garg, et al., "Minimizing Completion Time of a Program by Checkpointing and Rejuvenation", SIGMETRICS '96 May 1996 PA, USA, pp. 252-261.

Ingrid M. Graf, "Transformation Between Different Levels of Workload Characterization for Capacity Planning", Fundamentals and Case Study, 1987 ACM, pp. 195-204.

Mark S. Squillante, "Analysis of Job Arrival Patterns and Parallel Scheduling Performance", Preprint, Performance Evaluation 36-37 (1-4) May 11, 1999, pp. 137-163 (pp1-33).

G. De Nicolao, et al., "On the World Decomposition of Discrete-Time Cyclostationary Processes", IEEE Transactions on Signal Processing, vol. 47, No. 7, Jul. 1999, pp. 2041-2043.

A. Alan B. Pritsker, et al., "Total Capacity Management Using Simulation", Proceedings of the 1991 Winter Simulation Conference, pp. 348-349.

John A. Rice, "Mathematical Statistics and Data Analysis", Simple Linear Regression, wads worth and Brooks, Pacific Groove, CA, pp. 459-462.

Mark J. Shensa, "The Discrete Wavelet Transform: Wedding the A Trous and Mallat Algorithms", IEEE Transactions on Signal Processing, vol. 40, No. 10, Oct. 1992, pp. 2464-2482.

Radu Stoica, et al., "The Two-Dimensional Wold Decomposition for Segmentation and Indexing in Image Libraries", IEEE 1998, pp. 2977-2980.

Martin Vetterli, et al., "Wavelets and Filter Banks: Theory and Design", IEEE Transactions on Signal Processing, vol. 40, No. 9, Sep. 1992, pp. 2207-2232.

Mark S. Squillante, et al., "Internet Traffic: Periodicity, Tail Behavior and Performance Implications", IBM Research Report No. RC 21500, Feb. 1999, pp. 1-10.

* cited by examiner

METHOD AND APPARATUS FOR PREPROCESSING TECHNIQUE FOR FORECASTING IN CAPACITY MANAGEMENT, SOFTWARE REJUVENATION AND DYNAMIC RESOURCE ALLOCATION APPLICATIONS

BACKGROUND OF THE INVENTION

1. Field of the Invention

The present invention generally relates to a system management system, and more particularly to preprocessing data for forecasting in capacity management applications, or in software rejuvenation applications, and to decomposing a signal used for prediction into different components, with the decomposition relying on the wavelet transform and on time-domain methods.

2. Description of the Related Art

Within a computer system, or a computer network, "capacity management" describes the process of maintaining resources above a minimum desired level, such as by adapting configurations or by purchasing new equipment (e.g., see N. G. Duffield et al., "A Flexible Model for Resource Management in Virtual Private Networks"; *Proc. ACM SIGCOMM '99*, 1999, pp. 95–108; I. M. Graf, "Transformation Between Different Levels of Workload Characterization for Capacity Planning: Fundamentals and Case Study", *Proc. ACM Conf. Measurement and Modeling of Computer Systems*, 1987, pp. 195–204; and A. B. Pritsker et al. "Total Capacity Management Using Simulation", *Proc. 1991 Winter Simulation Conference*, 1991, pp. 348–355.

For example, the system administrator of a Local Area Network (LAN) decides when new disks are needed because the existing ones are low on free space, when the network backbone should be upgraded, to support increased traffic, or when new servers are needed, to respond to new user requirements.

Traditionally, system administrators monitor quantities, such as network traffic, available space on disks, response times of servers, number of user processes running on different machines, etc. and make appropriate decisions when resources are low or close to being exhausted. It is important to make the right decision at the right time. Unnecessary upgrades of equipment are expensive and might not result in better productivity. At the same time, decisions to upgrade should be made before resources are completely utilized, since productivity is reduced until the upgrade is actually performed.

Hence, the role of prediction is becoming very important in capacity management. Available software packages, such as IBM Netfinity Capacity Manager module of the IBM Netfinity Service Manager package, now incorporate prediction capabilities. That is, using past data, the system projects resource utilization into the future, computes confidence intervals for the prediction, and provides a probabilistic estimate of when the resource(s) will be close to exhaustion.

Similar prediction problems can be found in the area of Software Rejuvenation (e.g., see S. Garg et al., "Minimizing Completion Time of a Program by Checkpointing and Rejuvenation", *Proc. ACM SIGMETRICS Conference on Measurement & Modeling of Computer Systems*, 1996, pp. 252–261).

Software rejuvenation is a discipline concerned with scheduling the termination and re-initialization of applications or operating systems, in order to avoid catastrophic crashes. It is the mechanical equivalent of preventive maintenance. The assumption is that "bugs" in software might cause programs to allocate resources and never release them. Eventually, a crash is caused when the needed resource is exhausted. A typical example of this kind of "bug" is a memory leak, where an application allocates memory but mistakenly never releases it. Other resources that can be exhausted are semaphores, mutexes, handles etc.

The motivation for rejuvenating software rather than waiting for a crash is twofold. A first reason is to prevent data loss and secondly to guarantee quality of service. For example, a crash of a database usually requires a rollback operation to a consistent state (reliably stored on persistent media during periodic checkpoint operations), the reconstruction of all the memory-based data structures, and the re-execution of all the transactions that have been committed after the most recent checkpoint, and have been stored in an appropriate log. The time required to recover from a catastrophic crash can be in the order of hours to tens of hours, during which the database is not available to process new transactions. Since the re-initialization of the database to a checkpointed state is the least expensive of the above operations, it is beneficial to schedule the rejuvenation of the piece of software right after a checkpoint operation, possibly during a time of low utilization.

In its simplest form, rejuvenation is based on static scheduling, where the application or the operating system is periodically restarted. Adaptive approaches to software rejuvenation are also possible. For example, quantities related to resources that can be exhausted could be monitored, and their values and variations over time can be analyzed by a prediction algorithm. If a resource is in danger of being exhausted in the near future, then the system administrator is notified of the problem and decides whether a rejuvenation should be appropriately scheduled.

The combination of a static schedule and prediction techniques is also possible. Here, a static schedule is put in place. Then, using the prediction techniques, the software package can estimate the probability that a crash happens if a scheduled rejuvenation is not executed. If this probability is acceptably low, then the rejuvenation step is skipped.

Prediction of data is a well studied field. By analyzing the values of the quantity acquired over a period of time (a time series), prediction methods make an inference about the future values. Typical statistical analysis and forecasting of time series (e.g., see G. E. P. Box et al., "*Time Series Analysis, Forecasting and Control*", Holden-Day Inc., San Francisco, Calif., 1970) assume that the data can be modeled as a realization of a stationary stochastic process. Usually, the data is modeled as the superposition of a deterministic component and a stochastic component.

The deterministic component is usually modeled as a linear or negative exponential function of time, while the stochastic component is usually modeled as white noise, as an autoregressive process (AR), a moving average process (MA), an autoregressive-moving average (ARMA) process, or a derived process (e.g., see M. S. Squillante et al., "Analysis of Job Arrival Patterns and Parallel Scheduling Performance", *Performance Evaluation* 36–37(1–4): 137–163 (1999). Prediction is then performed by estimating the parameters of the noise model, fitting a curve to the deterministic data, and using the curve to extrapolate the behavior of the data to the future.

Often, confidence intervals for the prediction can be estimated from the data. A p % confidence interval for the value $x(t)$ taken by the process x at time t is the set of values between two extremes $x_L(t)$, $x_H(t)$. The meaning of a p % confidence interval is the following. That is, if the process x satisfies the assumptions used to compute the confidence interval, then the probability that x(t) belongs to the interval [$x_L(t)$, $x_H(t)$] is p/100. If p is close to 100, then the probability that x(t) lies outside the interval is very small.

Often, periodic components can be seen in the data. For example, in a corporate computer system, the utilization of the system tends to be more substantial in the morning than around lunch time or at night, while Internet Service Providers (ISPs) experience an increase of residential traffic in the evenings. Periodic components can be potentially substantial, and, if not taken into account, can significantly affect the prediction accuracy. Methods for estimating periodic and seasonal behavior are known in the art (e.g., see M. S. Squillante et al., "Internet Traffic: Periodicity, Tail Behavior and Performance Implications". IBM Research Report No. RC21500, 1999).

Similar methods are used to describe time series in terms of uncorrelated stochastic processes. For example, the Wold decomposition (e.g., see T. W. Anderson, *The Statistical Analysis of Time Series*, John Wiley & Sons, Inc., 1971) (Chapter 7.6.3), has been used to represent time series as a sum of a MA process (of possibly infinite order) and an uncorrelated white process (e.g., see G. Nicolao et al., "On the Wold Decomposition of Discrete-time Cyclostationary Processes", *IEEE Trans. Signal Processing*, 47(7), July, 1999 pp. 2041–2043). Wold-like decompositions have been extensively used in image representation, where images are modeled as 2-dimensional random fields, and represented as a sum of purely non-deterministic fields, several harmonic (i.e., 2-dimensional sinusoids) fields, and a countable number of evanescent fields (e.g., see J. M. Francos, "Bounds on the Accuracy of Estimating the Parameters of Discrete Homogeneous Random Fields with Mixed Spectral Distributions", *IEEE Trans. Information Theory*, 43(3), May, 1997 pp. 908–922). A typical application of 2-dimensional Wold-like decomposition is image retrieval in digital libraries (e.g., see R. Stoica et al., "The Two-dimensional Wold Decomposition For Segmentation And Indexing In Image Libraries", *Proc. of the 1998 IEEE Int'l Conf Acoustics, Speech and Signal Processing*, 1998, pp. 2977–2980).

Prediction in existing capacity management and rejuvenation systems is sensitive to the underlying assumptions described above. Data describing the overall behavior of large systems sometimes satisfies such assumptions. For example, the overall request traffic arriving at a very large web site (e.g., the Olympic web site) can be successfully analyzed using known techniques.

However, in most scenarios, the data does not satisfy the assumptions, and the resulting prediction can be either erroneous, or can produce very wide confidence intervals. Hence, the usefulness of the prediction is significantly reduced.

Additionally, often the data contains useful information that is not captured by the known types of decompositions. For example, changes over time of parameters of the different component processes, such as the increase of the variance of the non-deterministic component of a monitored quantity might be a powerful indicator of resource exhaustion, and would not be captured by the known decompositions, where the stationarity assumption implies that the non-deterministic component must have a fixed variance. Similarly, significant information is contained in certain characteristics of the monitored quantities, such as the presence, time behavior and amplitude of spikes or of jumps, which are hardly detectable from the known decompositions.

SUMMARY OF THE INVENTION

In view of the foregoing and other problems, drawbacks, and disadvantages of the conventional methods and structures, an object of the present invention is to provide a method and system in which prediction in existing capacity management and rejuvenation systems is improved.

Another object is to provide a method and system in which data used satisfies the underlying assumptions, such that the resulting predictions can be relied upon and have an acceptable confidence interval, thereby providing a high utility of the prediction.

In a first aspect of the present invention, in a computer system where forecasting of computing resources is performed based on past and present observations of measurements related to the resources, a method for preprocessing including decomposing the past and present observations into a smooth time sequence, a jump time sequence, a noise time sequence and a spike time sequence, the method includes detecting the spikes in a signal representing the measurements, detecting the jumps in the signal, removing spikes and jumps from the signal, and removing the noise from the signal, to obtain a smooth version of the signal.

With the unique and unobvious features and aspects of the present invention, a methodology for preprocessing (e.g., "massaging") the data is provided in order to overcome the limitations of the existing methods.

Depending upon the particular application involved, the method divides the data into different components for subsequent use in a forecasting system.

For example, it is noted that real data for capacity management and software rejuvenation has non-stationary noise, and contains at least two components (e.g., "spikes" and "jumps") that are not accounted for in the conventional prediction methods used in practice and taught in the art. A "spike" is a sudden, up-and-down variation of the monitored quantity, that cannot be explained by a noise model. A "jump" is a sudden upward or downward variation of the monitored quantity.

The inventive method preprocesses the data by dividing it into a plurality (e.g., four) of components (e.g., a smooth process, jumps, spikes and noise). Each of the components can then be further analyzed by the prediction algorithms, to, for example, extract seasonal components, identify trends, and forecast future behavior as taught in the art. It is noted that alternatively or additionally to the above-mentioned four components (e.g., smooth, jumps, spikes and noise), other components can be used with the present invention as would be known by one of ordinary skill in the art taking the present specification as a whole.

An exemplary embodiment of the inventive method uses the wavelet transform (e.g., see I. Daubechies, *Ten Lectures on Wavelets*, Society for Industrial and Applied Mathematics, Philadelphia, Pa., 1992). The wavelet transform produces a representation of signals which is localized in both time and frequency (unlike the time-domain and the Fourier transforms). The invention uses some properties of the transform, in particular those related to near-optimal denoising (e.g., see D. L. Donoho, "De-noising by Soft-thresholding", *IEEE Trans. Information Theory*, 41(3), May, 1995, pp. 613–627), and its ability to generate a multiresolution pyramid.

Thus, with the inventive method (and system), in most scenarios, the data satisfies the assumptions, and the resulting prediction can be reliable, and with acceptable (prediction) confidence intervals. Hence, the usefulness of the prediction made by the inventive method is significantly increased over the conventional methods.

Thus, the invention provides decomposition into different components, each of which captures different aspects of the data and can be analyzed independently, for instance using known methods.

Further, the inventive method works under general assumptions, namely no stationarity of the data or of components of the data is assumed.

Additionally, the method produces components that can be more efficiently analyzed, for example using methods known in the art, to produce better and more reliable prediction.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
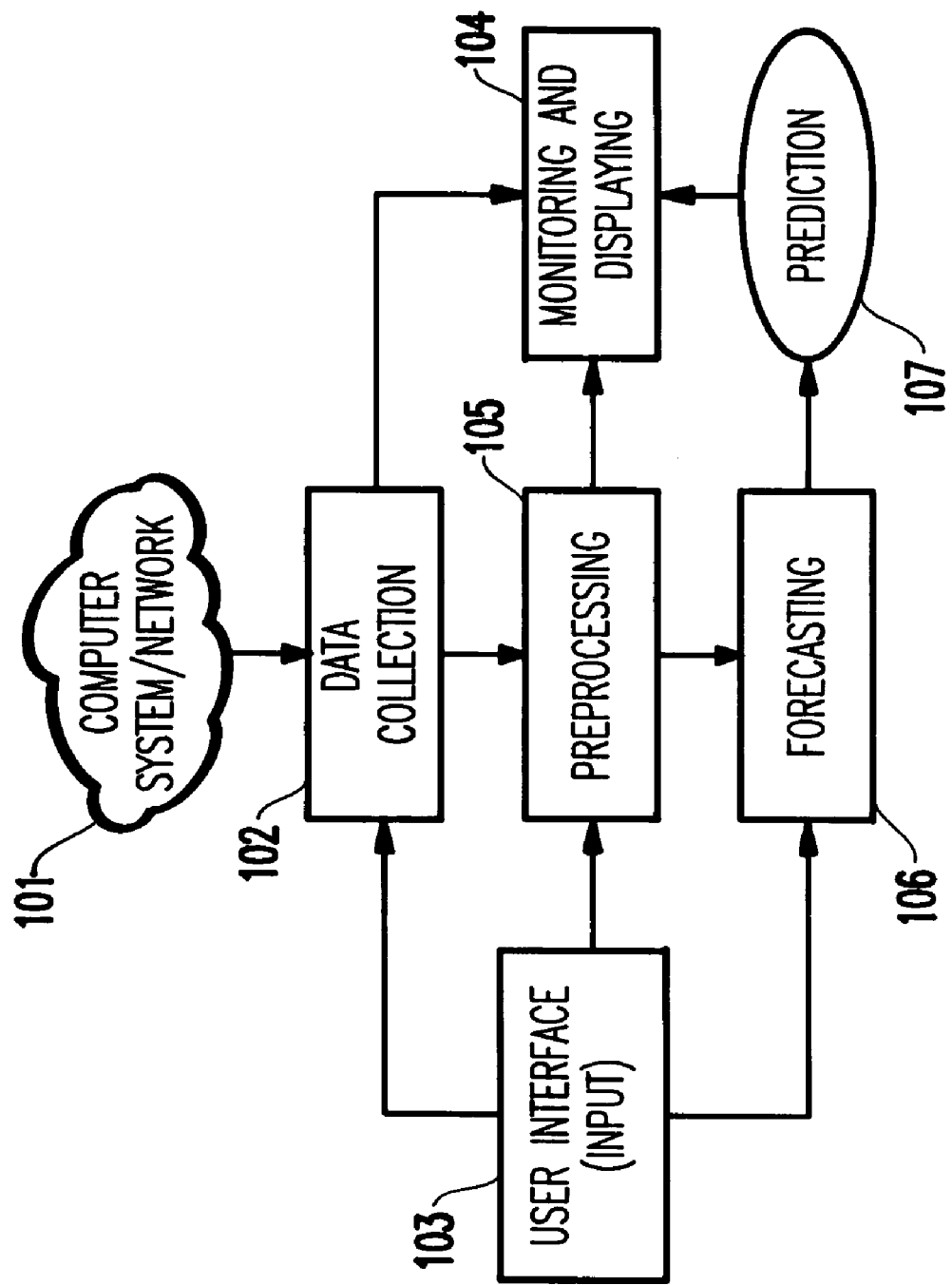
FIG. 1 depicts an exemplary system according to the present invention, where data describing the behavior and operation of a computer system is collected, preprocessed, and analyzed to produce a prediction.

Referring now to the drawings, and more particularly to FIGS. 1–16, there are shown preferred embodiments of the method and structures according to the present invention.

Preferred Embodiment

FIG. 1 depicts an exemplary system 100 having features of the present invention. As depicted, a computer system, a cluster of computers, or a computer network 101 (henceforth, referred to as the "system") is monitored by a data collection program or process 102 which samples at known time instants quantities (e.g., characteristics) pertaining to the computer system or computer network.

Such quantities include, but are not limited to, those that describe the functioning, operations, and behavior of the system. Examples include the available Megabytes in individual disks, the number of packets transmitted over individual links, the percentage of utilization of individual processors, the available swap space on individual computers, the number of processes running, etc., and aggregates over the entire system, such as the overall number of packets transmitted over the entire network, or over subsets of the system, such as the total number of available Megabytes in all the disks managed by individual servers.

Data collection is known in the art, and, in computer systems, is implemented by incorporating, within the data collection application, calls to routines that retrieve current values of quantities of interest. These routines can be part of the operating system (OS), or part of the Application Programmer Interface (API) of software programs that manage resources. When resources are managed by hardware devices, and these hardware devices monitor the utilization of the resources, data can be collected by communicating appropriately with the device.

For example, the device can store the values of the resources in its own memory, and the architecture of the computer system can map into its own memory space the memory of the device. In this case, the data collection program can read the values of the desired resources by reading the appropriate memory locations.

The data collection operation is controlled by a system administrator or an operator via a user interface 103 using specified data collection parameters, such as the quantities to be monitored and the sampling frequency.

The data collected by the data collection program 102 can be displayed by a monitoring and displaying facility 104 of the user interface. Data is commonly shown as periodically updated graphs. Obviously, the data could be displayed/output in any of a number of display formats.

Then, the data collected by data collection program 102 is preprocessed by a preprocessing program or process 105. The operation of the preprocessing program is controlled by a system administrator or by an operator via the user interface 103, which can range from a configuration file to a complex graphical user interface (GUI). Such a user interface may include at least one input device including a keyboard, trackball, joystick, pointing device, etc. The result of the preprocessing step can be displayed by the monitoring and displaying module 104.

The preprocessed data serves as an input to a forecasting algorithm (or suite of algorithms) 106 which analyzes the preprocessed data and produces a prediction 107. The operation of the forecasting program is controlled via the user interface 103, and the prediction result is displayed by the monitoring and displaying module 104.

Data collection happens periodically or at predefined times. Steps 104, 105 and 106 are repeated after every new data acquisition. Those skilled in the art will appreciate that the exemplary scheme and configuration of FIG. 1 is typical of both capacity management and software rejuvenation systems.

Figure 2:
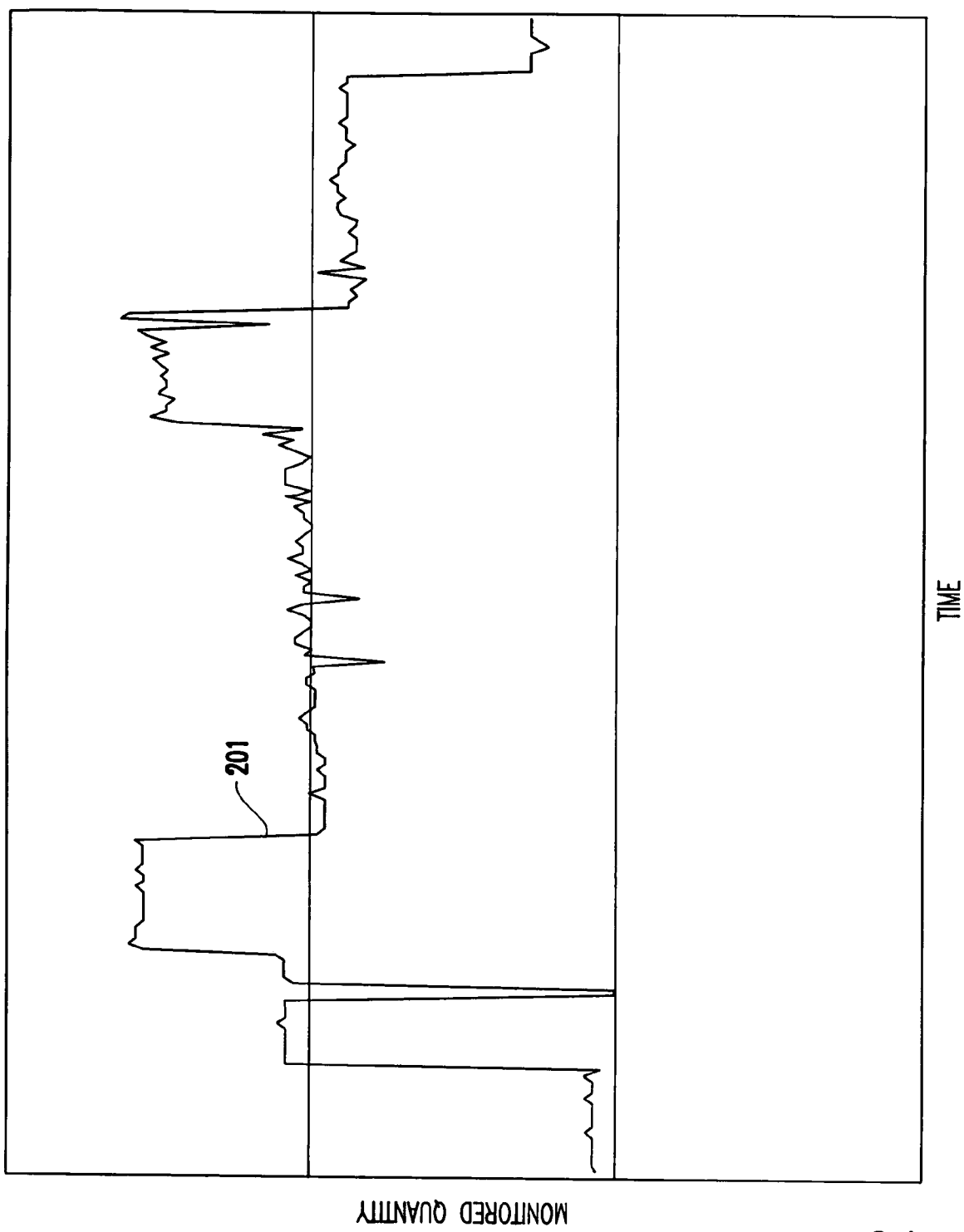
FIG. 2 depicts an exemplary time series acquired with the apparatus depicted in FIG. 1, and used for capacity management or software rejuvenation purposes.

FIG. 2 shows an exemplary signal 201 acquired by the data collection program 102. The signal in the exemplary application includes 200 points acquired 5 minutes apart from each other, and thus describes the behavior of a monitored quantity over a period of about 16 hours and 40 minutes. FIG. 2 is a simplified version of the type of graphs produced by the monitoring and displaying module 104. When necessary, the original signal will be denoted by x, its value at time i by x(i), a sequence of values by $\{x(t)\}$, and the part of a sequence between times i and k by $\{x(i), \ldots, x(k)\}$.

Figure 3:
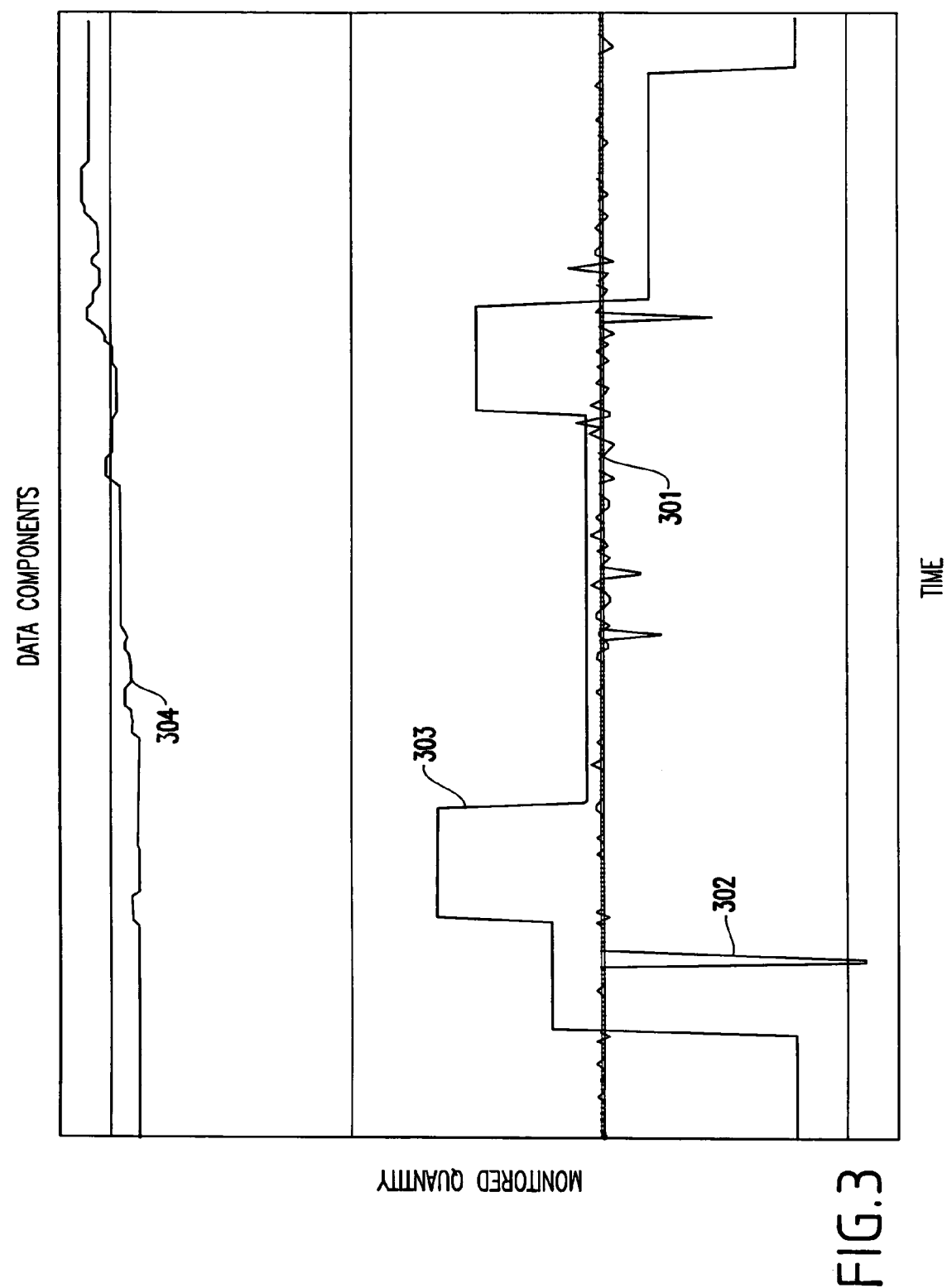
FIG. 3 shows the decomposition of the signal of FIG. 2 into a smooth component, a spike time series, a jump time series and a noise series.

FIG. 3 shows the decomposition of the signal 201 into a plurality (e.g., four) components in the spirit of the current invention. The plurality of components include: noise 301, defined as unpredictable localized variations of the signal and denoted by z; spikes 302, which are unpredictable localized up-and-down or down-and-up variations that cannot be explained as noise, denoted by p; jumps 303, a zero-mean component, which is a piecewise constant except at discontinuity points where the signal suddenly changes either upwards or downwards, but not in both directions, denoted by j; and smooth 304, defined as the difference between the original signal 201 and the sum of noise 301, spikes 302 and jumps 303, denoted by y. Hence:

$\{x(t)\}=\{z(t)+p(t)+j(t)+y(t)\}$.

Figure 4:
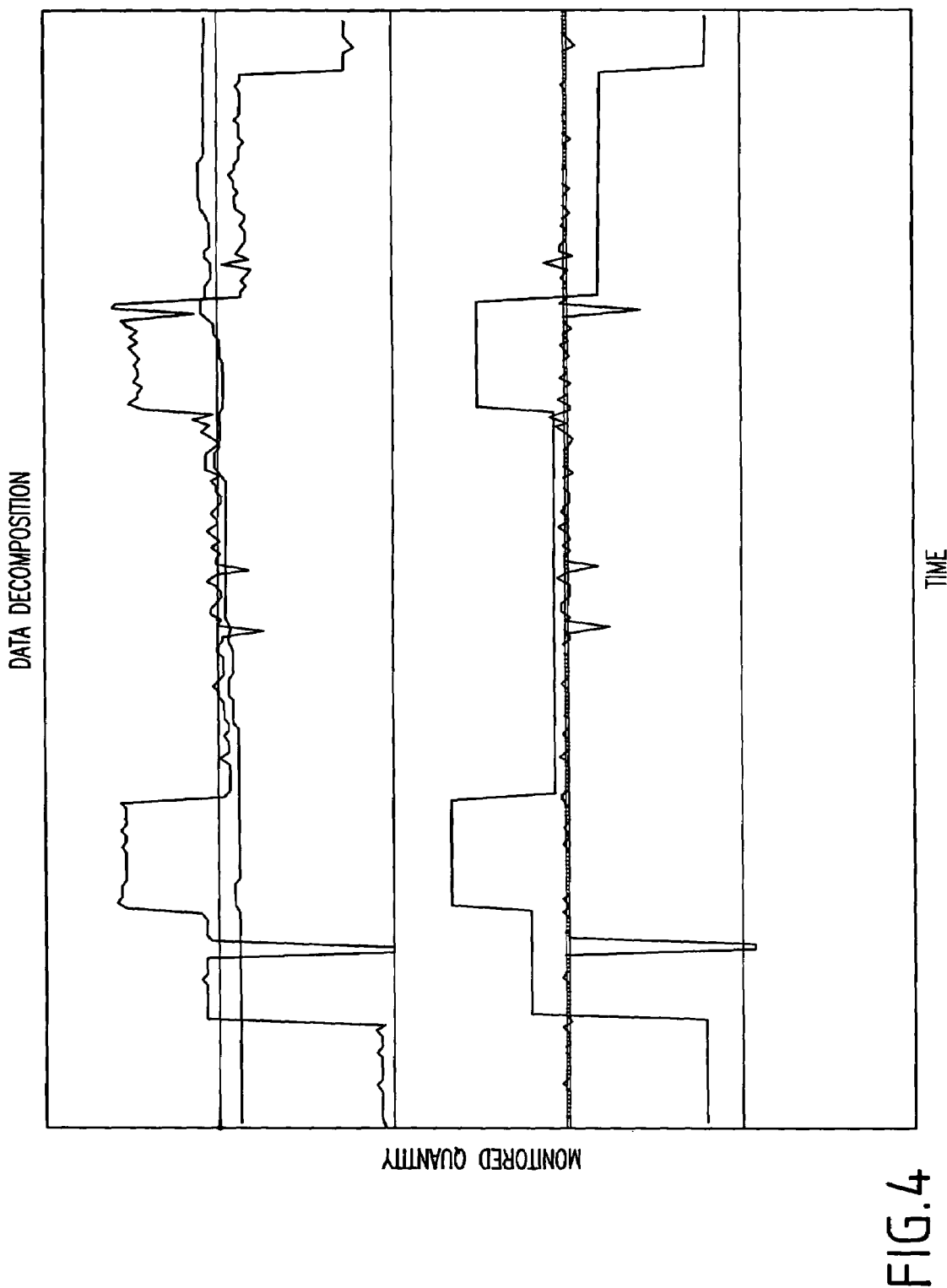
FIG. 4 shows the time series depicted in FIG. 3 together with its decomposition shown in FIG. 3.

FIG. 4 shows the original signal 201 and the four components: noise 301, spikes 302, jumps 303 and smooth component 304, superimposed on the signal 201. It is important to note that the smooth component has an upwards trend, which is very hard to detect from the original signal 201 with conventional techniques.

Those skilled in the art will appreciate that the decomposition of the present invention is applicable as a preprocessing step to both capacity management problems and to software rejuvenation problems.

Figure 5:
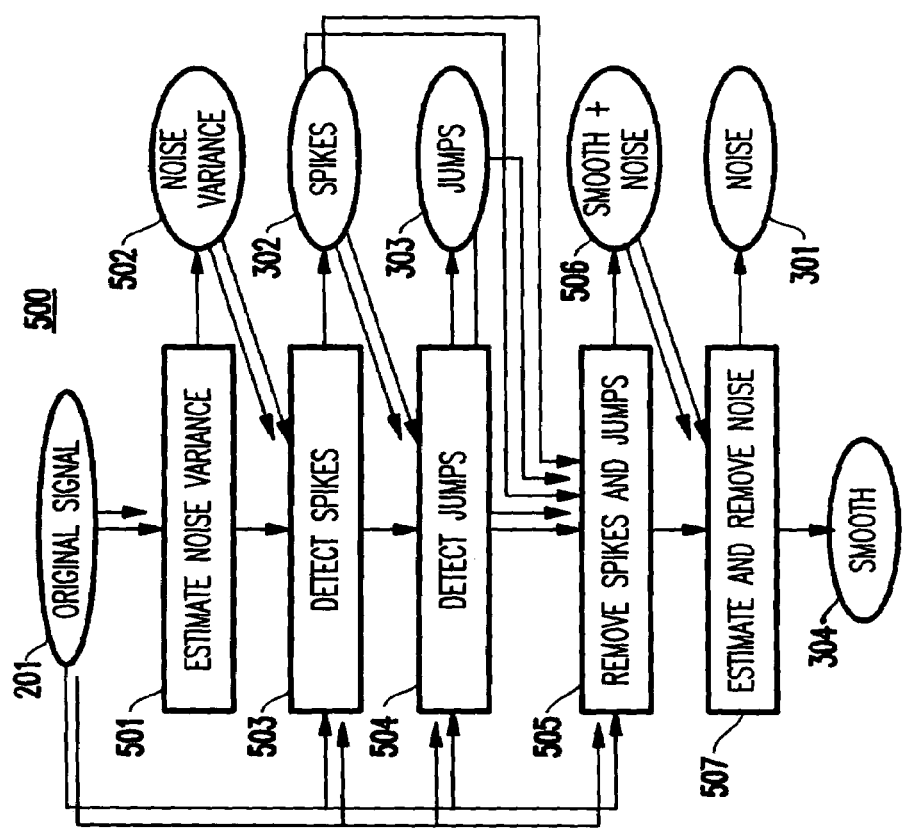
FIG. 5 shows a flowchart of the method 500 according to the present invention for decomposing a signal into a smooth component, a spike series, a jump series and a noise series.

FIG. 5 shows an exemplary flowchart of a method 500 for generating the preprocessing decomposition of the data according to the present invention.

In step 501, a noise estimator takes as input the original data (signal 201) to be decomposed, and produces an estimate of the variance 502 of the noise. The estimator of the noise can be selected among, but is not limited to, one of the noise estimators taught, for example, in U.S. Pat. No. 4,074,201. While this noise estimator in U.S. Pat. No. 4,074,201 is a hardware implementation, as would be known by one of ordinary skill in the art, such could be implemented in software.

A spike detection step 503 receives, as an input, the estimate of noise variance 502 and the original signal x 201, and produces the detected spikes p 302.

A jump detection step 504 takes as inputs the original signal 201 and the detected spikes 302, and produces the detected jumps 303.

A spike and jump removal step 505 takes as inputs the original signal 201, the detected spikes 302 and the detected jumps 303, and subtracts the detected spikes and the detected jumps from the original signal 201.

The output 506 of the subtracting step 505 is smooth plus noise components as represented below as:

$\{z(t)+y(t)\}=\{(x(t)-p(t)-j(t)\}$.

A re-estimate and noise removal step 507 takes as an input the output of the spike and jump removal step 505, and optionally performs a re-estimate of the noise variance of the noise. Then, the noise is separated from the smooth version of the signal. As a result, the noise sequence 301 and the smooth sequence 307 are produced.

Again, it is noted that in step 507, the re-estimate of the variance of the noise is optional and need not be performed. That is, the original estimate of the noise variance 502 (e.g., produced from step 501) could be employed.

Figure 6:
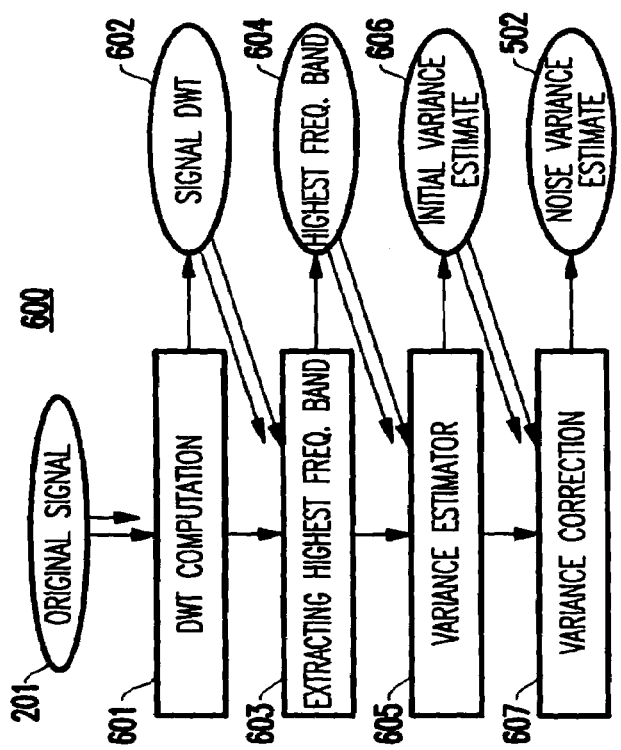
FIG. 6 shows a method 600 for estimating the variance of the noise sequence from the original signal using a wavelet transform, and including a variance estimation and a variance correction step.

FIG. 6 depicts an exemplary flow chart of a method 600 for estimating the noise variance (e.g., the method of Step 501 shown in FIG. 5 and briefly described above).

Step 601 takes as an input the original signal 201, and computes the signal Discrete Wavelet Transform (DWT) 602, described in further detail below with reference to FIGS. 7A–7B.

Step 603 takes as an input the DWT 602, and extracts the highest frequency subband 604. Those skilled in the art will appreciate that the operations performed by Step 603 depend on the format of the DWT 602 produced by step 601. For example, if Step 601 stores the different subbands in different data structures, then step 603 is a selection (e.g., copying or selecting a particular piece of the transform) of the transform. That is, the transform could be divided into different bands (bands or sub-bands), and the highest frequency subband can be selected.

Step 605 takes as an input the highest frequency subband 604, and produces an initial noise variance estimate 606 as follows. $\{z(t)\}$ will be called the noise sequence. The noise is Gaussian if, for all i, z(i) is a random variable having Gaussian distribution. By definition, the expected value of the noise is zero. Gaussian random variables are also commonly called Normal random variables. The noise sequence is said to be white if $E[z(i)z(j)]=s^2$ if i=j, and $E[z(i)z(j)]=0$ otherwise, where $E[.]$ denotes the expected value.

If the noise is Gaussian and White, then its power spectrum is constant, which roughly means that the noise contributes equal energy to all frequencies. Real-world (actual) signals, and in particular those used for capacity management and software rejuvenation, have a power spectrum that is significantly higher at lower frequencies.

Hence, step 603 assumes that most of the energy in the highest frequency subband 604 of the DWT 602 of the original signal 201 is due to noise. It is well known in the art that the content of the highest frequency subband of the DWT of white noise is itself white noise with the same variance.

Then, step 605 uses a standard estimator of variance (e.g., see E. L. Lehman, "*Theory of Point Estimation*" Society for Industrial and Applied Mathematics, Philadelphia, Pa., 1992) using as input data the values of the highest frequency subband. The estimate 606 overestimates the variance of the noise because it implicitly relies on the assumption that the highest frequency subband contains only noise, and ignores the contributions of spikes and jumps. For the purpose of long-term forecasting, the high-frequency components of the smooth signal y can in general be treated as part of the noise.

Step 607 corrects the initial estimate of the variance 606. In a system where the decomposition is recomputed periodically (e.g., at fixed intervals or when a new sample is acquired), step 607 uses the spike 302 and jump series 303 extracted during the previous decomposition, applies to these series steps 601, 603 and 605, and produces an estimate of the contribution of spikes and jumps to the variance of the highest frequency subband.

This estimate is subtracted from the initial variance estimate 606 to produce the actual estimate 502. It is noted that the first time the decomposition is computed, no results from previous decompositions are available, and hence different strategies are possible.

For example, in one embodiment, step 607 does not modify the value 606, and therefore the first time the decomposition is computed, the estimates 606 and 502 are identical. In another embodiment, steps 501, 503, 504 and 505 are repeated twice after the first data acquisition.

That is, during the first iteration, step 607 does not modify the initial variance estimate 606, and the noise variance estimate 502 is identical to initial variance estimate 606. The spike series 302 and the jump series 303 are computed as described above.

During the second iteration, the DWTs of the spike series 302 and of the jump series 303 extracted during the first iteration are computed, the highest frequency subbands are extracted and the variances estimated. The sum of the variance estimates is subtracted from initial variance estimate 606 to produce the actual noise variance estimate 502. It is noted that the spike series 302 and the jump series 303 could also be added together before computing the DWT and the correction term. This approach might produce a slightly different estimate 502.

The DWT (e.g., see I. Daubechies, "*Ten Lectures on Wavelets*", Society for Industrial and Applied Mathematics, Philadelphia, Pa., 1992), as shown in FIGS. 7A–7B, belongs to a large class of complete invertible transformations, which include the Fourier Transform and the Laplace Transform.

The one-step or one-level discrete wavelet transform (e.g., described in M. J. Shensa, "The Discrete Wavelet Transform: Wedding the a Trous and Mallat Algorithms", IEEE Trans. Sig. Proc. 40 (10), October 1992, pp. 2110–2130), depicted in FIG. 7A takes as an input the original signal 201, and filters it separately with two appropriate filters (e.g., an analysis high pass wavelet filter 701 and an analysis low-pass wavelet filter 702). High pass and low pass wavelet filters are related by mathematical relations described, for instance in M. Vetterli et al., "Wavelets and filter banks: Theory and design", IEEE Trans. Sig. Proc. 40 (9), September 1992, pp. 2207–2232. Then, the output of the high-pass filter is passed through a subsampling step 703 which discards every other sample, and produces the residual of the signal 705. The output of the low-pass wavelet filter 702 is passed through an identical subsampling step 704 which produces the detail of the signal.

Figure 7A:
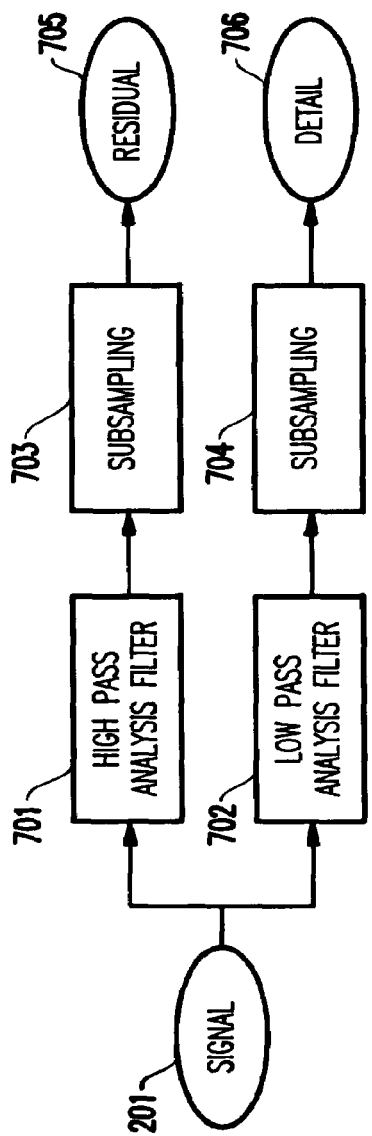
FIGS. 7A–7B respectively depict steps of the known direct and inverse wavelet transform.
Figure 7B:
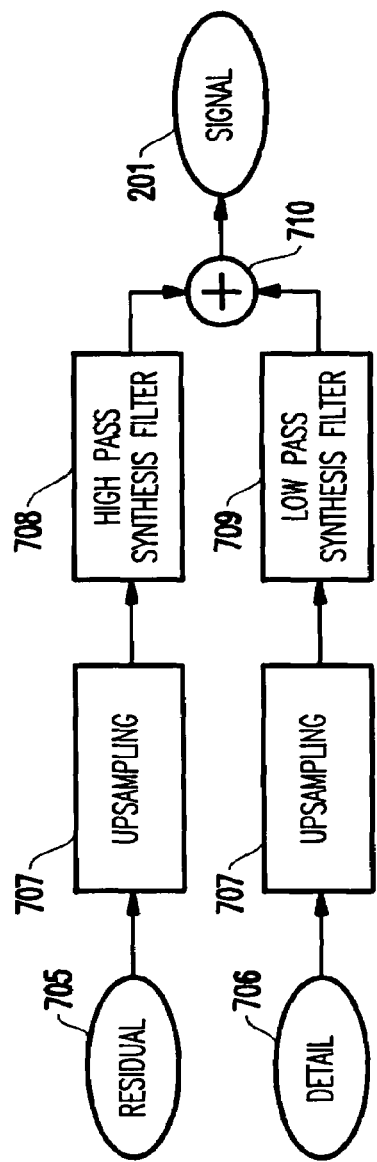

To compute an L-level (e.g., an integer value representing the number of components minus 1) wavelet transform, the one-level transform is computed, and the detail 706 is then recursively transformed using the process of FIG. 7B, until L residuals are obtained. The residual computed during the first iteration of the wavelet transform is the highest frequency subband of the transform. The wavelet transform is invertible, and the original signal can be reconstructed exactly from the transform.

FIG. 7B illustrates the inversion process for a 1-level transform. The residual 705 is upsampled 707. That is, it is interpolated with zero values, and filtered with a high-pass synthesis filter 708. The detail 706 is also upsampled 707 and filtered with a low-pass synthesis filter 709. The sequences produced by the filters 708 and 709 are added element by element by summing unit 710, to produce the original signal (201). For an L-level wavelet transform, the level-L detail and the level-L processed as described, to produce the level-(L-1) detail. The process is repeated using the higher level residuals and reconstructed details 706 until the original signal is produced.

Figure 8:
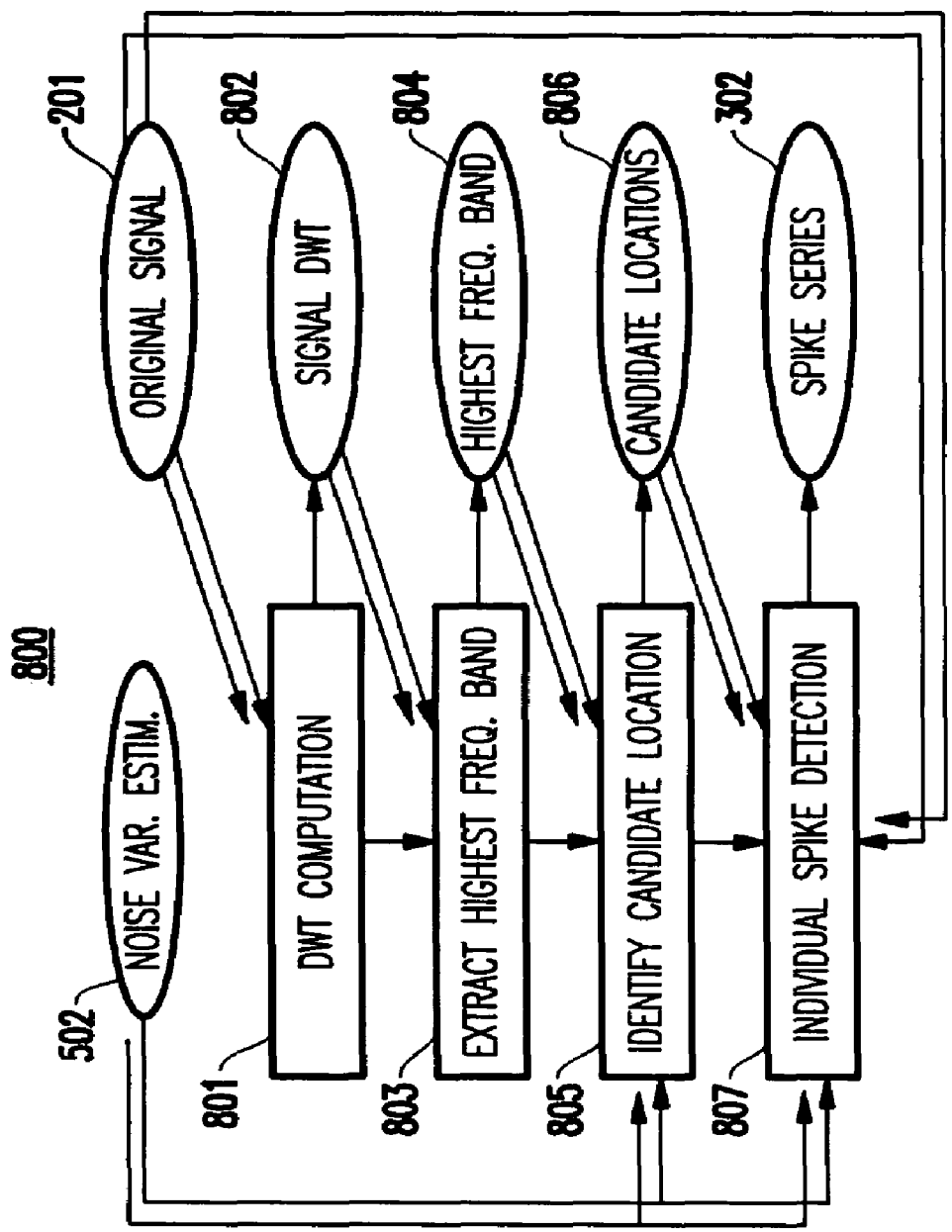
FIG. 8 shows a method 300 of a spike extraction from the original signal, using a wavelet transform, a candidate jump location identification, and an individual spike detection.

FIG. 8 illustrates the details of the spike extraction process 800 (e.g., corresponding to step 503 in FIG. 5). Step 801 takes as an input the original signal 201 and produces the signal DWT 802. Step 801 can be identical to step 601, but need not be, and in particular can rely on different analysis filters.

The highest frequency band 804 of the DWT 802 is extracted in step 803. Step 803 has the same function as step 603.

The thresholding step 805 takes as an input the highest frequency band 804 and the noise variance estimate 502, and identifies candidate locations of spikes 806.

In a preferred embodiment, the identification of candidate locations (step 805) includes thresholding the highest frequency subband with a threshold that depends on the estimate of the noise variance 502. All of the elements of the highest frequency subband that have an absolute value larger than the threshold are declared candidate locations. The threshold is selected to discard the noise and to retain values that cannot be statistically explained by a noise process.

For example, if the noise is Gaussian, the probability that a noise sample has an absolute value larger than 3.5 standard deviations is 0.0004, and the probability goes exponentially fast to zero as the threshold value increases. The standard deviation of the noise is estimated by the square root of the estimated variance of the noise (step 502). Setting the threshold to 5 standard deviations makes it very unlikely that a noise sample would be identified as a candidate location.

It is noted that not all candidate locations correspond to spikes. Hence, step 807 is performed to identify the actual individual spikes.

In a preferred embodiment, step 807 takes as inputs the original signal 201 and the estimated variance of the noise 502, and operates as follows.

Let the subscript i denote the location of a candidate. A spike of width 2 (e.g., "width" indicates a number of samples minus 1) at location i is a sequence of 3 samples, $x_{i-1}$, $x_i$, $x_{i+1}$, such that the difference $d_1=(x_{i-1}-x_{i+1})$ can be statistically explained as the sum variation in the smooth signal plus additive noise, while the difference $d_2=[x_i-(x_{i-1}+x_{i+1}+)/2]$ is too large to be explained by the same model.

In this embodiment, step 807 computes the differences $d_1$ and $d_2$, and compares them to two thresholds $T_1$ and $T_2$. If the absolute value of $d_1$ is less than $T_1$ and the absolute value of $d_2$ is larger than $T_2$, then the candidate is declared to be a "spike", otherwise the candidate is discarded.

In the preferred embodiment the thresholds $T_1$ and $T_2$ are functions of the estimated noise variance 502, and examples of values are $T_1$=3 standard deviations and $T_2$=5 standard deviations. Those skilled in the art will appreciate that different functions of the estimated noise variance could be used in the spirit of the present invention, and that different strategies to select the threshold can also be constructed (e.g., based on the spike, jump, noise and smooth sequences extracted previously).

Figure 9:
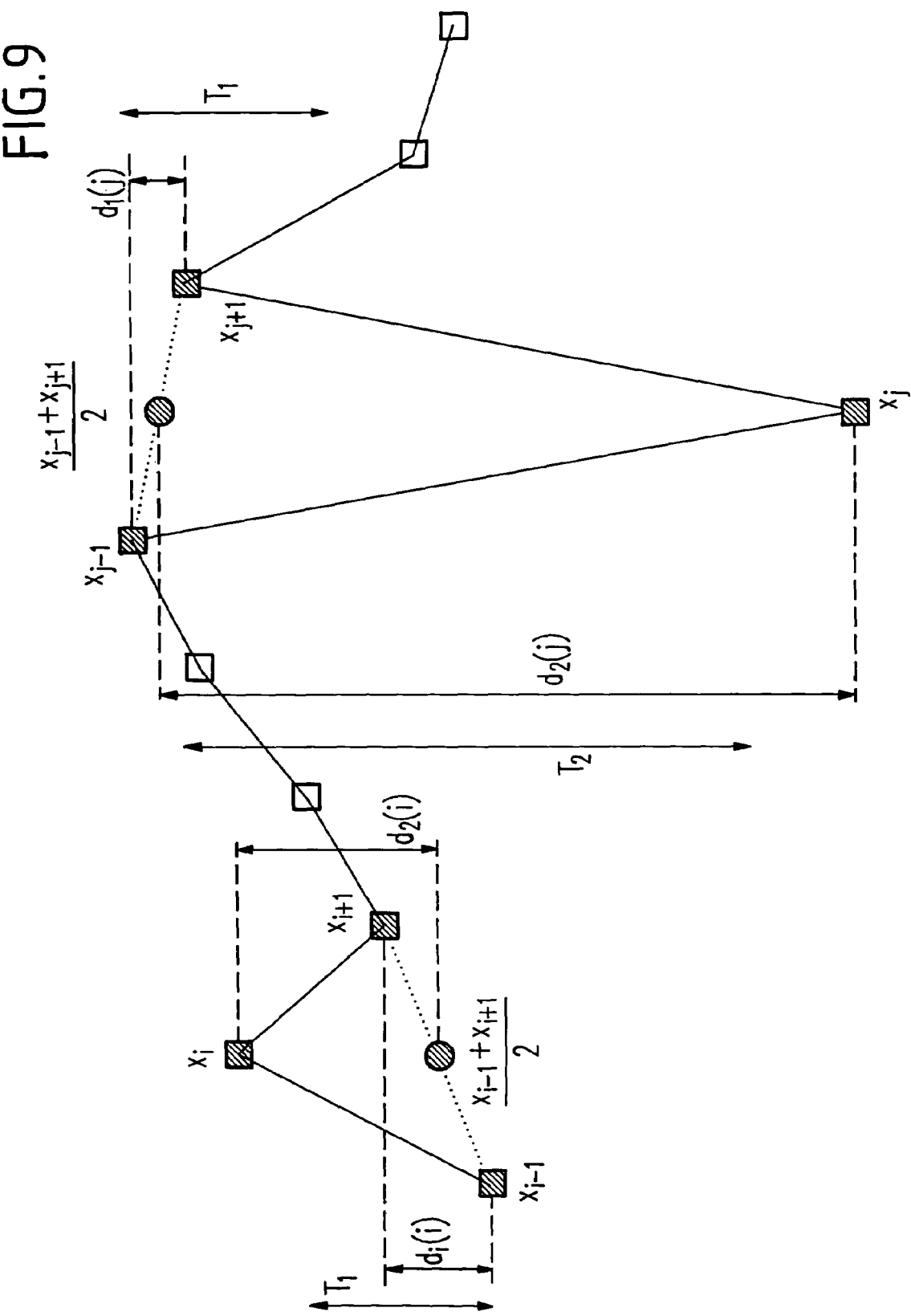
FIG. 9 illustrates exemplary operations of the individual spike detection 807 shown in FIG. 8, wherein the quantities used in a preferred embodiment to describe the individual spike detection being depicted in FIG. 9.

FIG. 9 is an example of the operation of step 807 (e.g., individual spike detection), and shows ten samples of a monitored quantity, identified by squares and connected by a continuous line.

Step 805 produces two candidate spike location, called i and j respectively. Step 807 analyzes first location i. It considers the values of the samples $x_{i-1}, x_i$, and $x_{i+1}$, and computes the differences $d_1(i)=(x_{i-1}-x_{i+1})$ and $d_2(i)=[x_i-(x_{i-1}+x_{i+1})/2]$, graphically depicted in FIG. 9 to the left and to the right of the samples respectively. These distances are compared to the thresholds $T_1$ and $T_2$, respectively. $T_1$ and $T_2$ are graphically represented in FIG. 9, to the left of $d_1(i)$ and to the right of $d_2(i)$ respectively. From FIG. 9, it is immediately apparent that $T_1>|d_1(i)|$ and $T_2>|d_2(i)|$, where $||$ denotes the absolute value. Hence, step 807 discards location i. It then applies the same algorithm to location j. The relevant quantities are depicted in FIG. 9. It is immediately apparent from FIG. 9 that $T_1>|d_1(j)|$ and $T_2<|d_2(j)|$. Hence, location j is declared a spike of the signal.

Those skilled in the art will appreciate that the jump detection 504 can be accomplished with a variation of the method described in FIG. 9.

Figure 10:
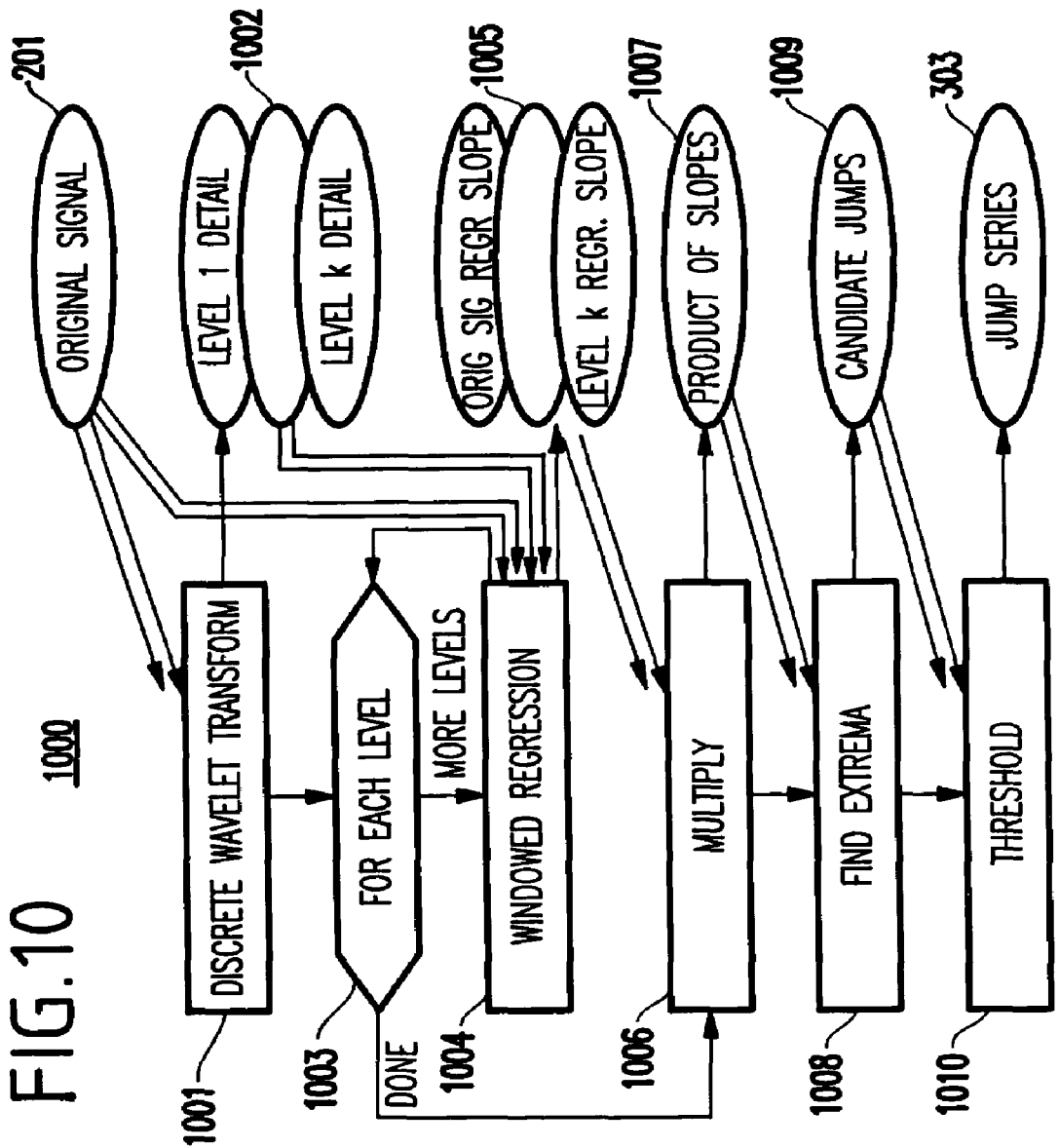
FIG. 10 illustrates a flowchart of a method 1000 for the jump extraction from the original signal according to the method of the invention, using a wavelet transform, windowed regression, extrema detection and thresholding operations.

That is, in a preferred embodiment, jump detection 504 (e.g., of FIG. 5) is performed with the method 1000 of FIG. 10.

The original signal 201 is used as an input to step 1001, which computes the DWT of 201 and produces, instead of the transform, the sequence of details obtained while computing the DWT, appropriately upsampled so that they have the same length as the original signal 201. The collection of the first k details plus the original signal is called a (k+1)-level multi-resolution pyramid.)

Step 1003 iterates over the (k+1) levels of the pyramid. At each level, step 1004 computes a windowed simple linear regression (e.g., see J. A. Rice, "*Mathematical Statistics and Data Analysis*", Wadsworth & Brooks/Cole. Pacific Grove, Calif. 1988) and produces the time series of the slopes 1005. One time series of slopes is computed for the original signal and one for each of the details. Hence, in total (k+1) series are produced.

The windowed regression step 1004 uses a sliding window of width w, which takes as an input a time series {x(1), . . . ,x(n)} and produces n−w+1 subseries {x(1), . . . ,x(w)}, {x(2), . . . ,x(w+1)}, . . . , {x(n−w+1), . . . ,x(n)}. A simple linear regression is then computed for each of the subseries, by fitting a straight line segment to the data using the least squares criterion, and the slope sequence {s(1), . . . ,s(n−w+1)} is then generated.

By applying windowing and segment fitting to each of the details (e.g., input 1002), step 1004 produces k+1 slope series of length n−w+1. Discontinuities of the signal correspond to local extrema in the slopes. Jumps are discontinuities that appear at the different levels of the multiresolution pyramid.

When all of the slope series have been computed, the multiplication step 1006 computes their product 1007 of the slopes. Since jumps appear as extrema of the slopes at all the levels of the multiresolution pyramid, the product 107 of the slopes reinforces local maxima.

If (k+1) is even, jumps appear as (large) local maxima of the product (1007). Otherwise, they appear as local maxima if the jump is upwards, and as minima if the jump is downwards. This criterion is used in step 1008 to extract the appropriate local extrema and produce a list of candidate jump locations 1009.

Step 1010 uses a threshold to remove extrema having a small absolute value (e.g., a small threshold signifies a small jump or no jump), and to retain the extrema with large absolute value, which are then declared jumps.

In another embodiment, step 1001 receives as an input the difference between the original signal 201 and the spike series 302, rather than the original signal 201. The latter embodiment is preferable when there are numerous spikes in the signal. The threshold for detection can be defined a-priori. In a preferred embodiment, the threshold is selected by the system administrator via the user interface.

Figure 11:
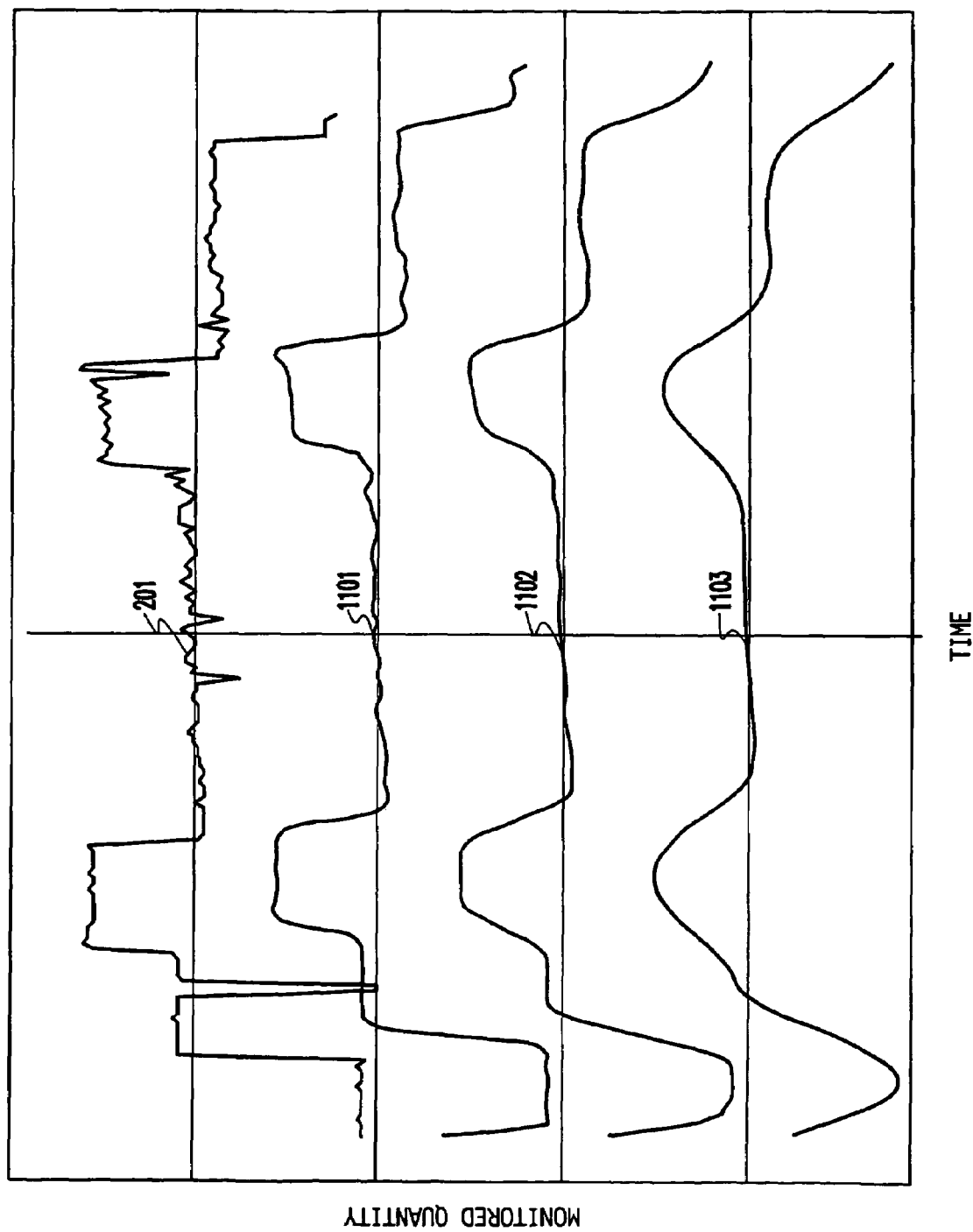
FIG. 11 illustrates an exemplary 4-level multiresolution pyramid obtained from the original signal using a modified wavelet transform.

FIG. 11 shows an example of a 4-level multiresolution pyramid. The original signal 201 is the base of the pyramid, or the level-0. The signal 201 is transformed using the method described in FIG. 7A, but the output of the low-pass filter 702 is not subsampled by step 704. The output of the low-pass filter 702 is the first level of the multiresolution pyramid (e.g., level 1) as shown in waveform 1101. The signal 1101 is filtered using the low-pass filter 702 to produce the second level of the multiresolution pyramid (e.g., waveform 1102), which is then filtered to produce the third level (e.g., waveform 1103).

Thus, the original signal is provided and then various levels (e.g., 1101, 1102, 1103, etc.) can be generated by processing the original signal through the structures of FIG. 7A (e.g., the residual).

Figure 12:
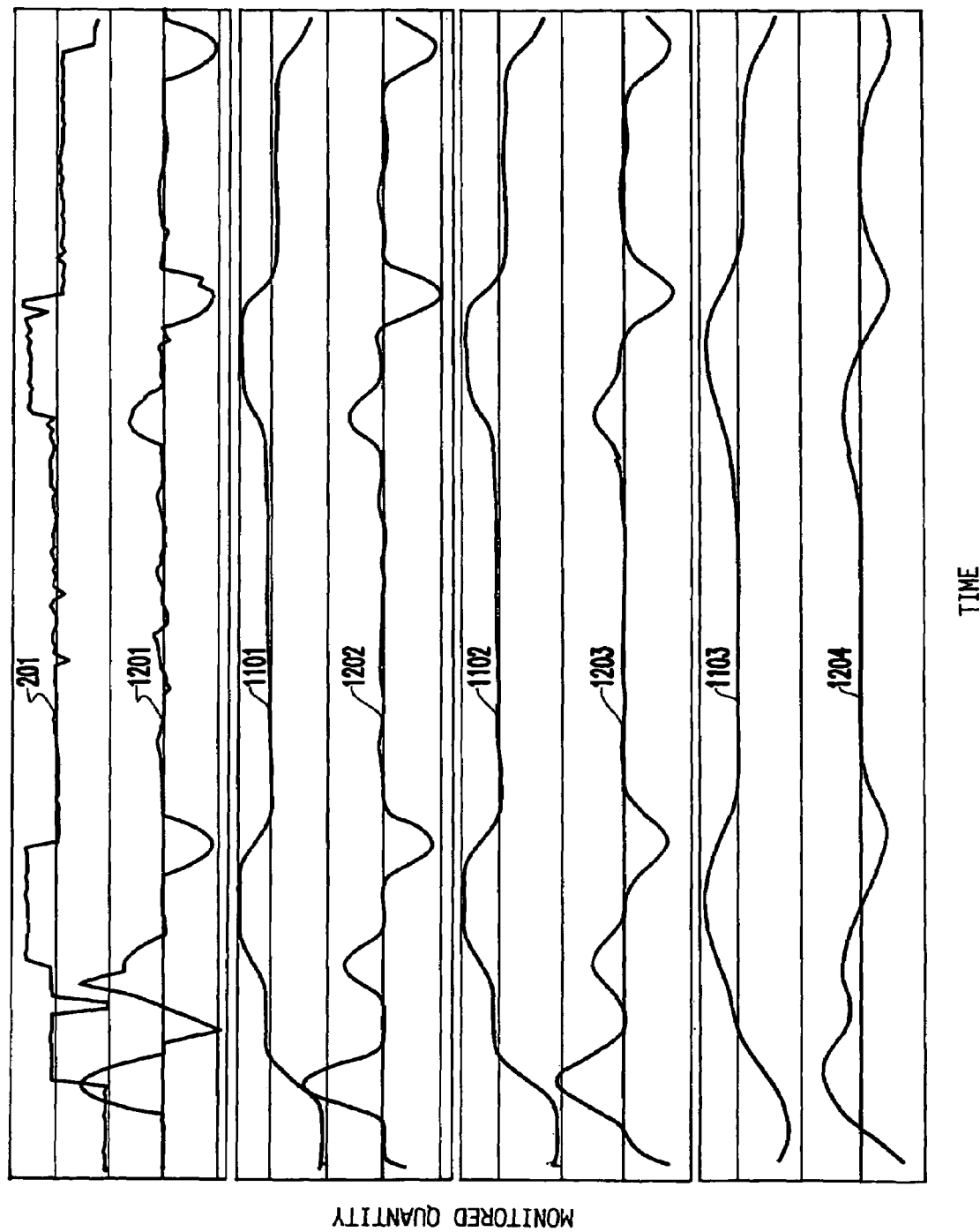
FIG. 12 illustrates an exemplary slope sequences associated with the windowed simple linear regression of the original signal and of the other levels of the multiresolution pyramid depicted in FIG. 11.

FIG. 12 shows the windowed slopes for the multiresolution pyramid of FIG. 11 (e.g., the detail 706 of FIG. 7A). By applying step 1004 to the original signal 201, the windowed slopes series 1201 is obtained. Similarly, by applying step 1004 to the other pyramid levels (e.g., waveforms 1101, 1102 and 1103), one obtains the slope series 1202, 1203 and 1204, respectively. Thus, if signal is processed through the structure of FIG. 7A, one would obtain the residual 1201 and the detail 1101.

Figure 13:
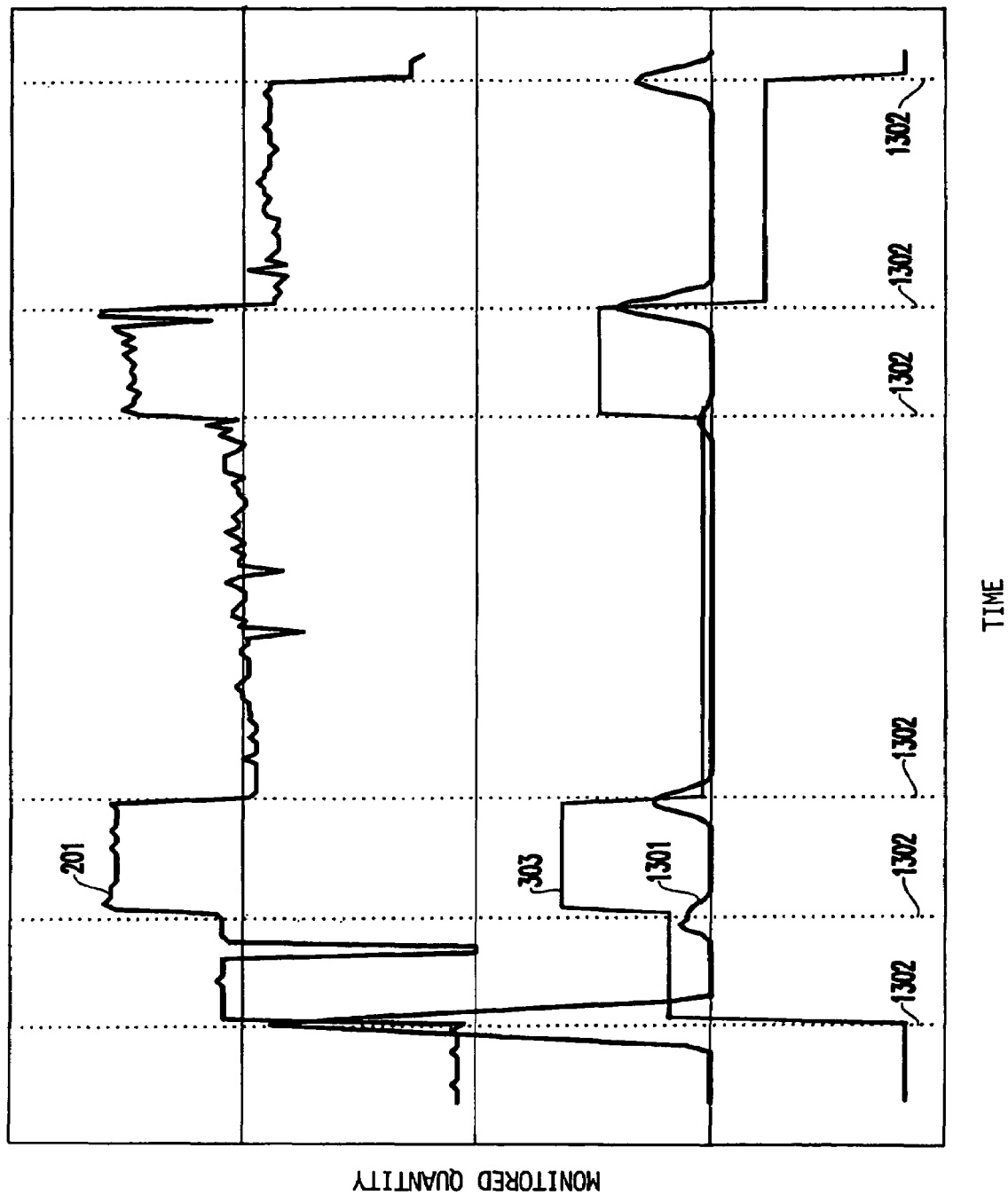
FIG. 13 illustrates an exemplary method for identifying the locations of jumps, using the product of the slope sequences depicted in FIG. 12.

FIG. 13 illustrates finding jumps, and specifically shows the product 1301 of the slope sequences 1201, 1202, 1203 and 1204, and the location of the positive local maxima 1302. Jumps can only happen at local maxima of the sequence/waveform 1301, since sequence 1301 is the product of an even number of slope sequences.

FIG. 13 also shows the original signal 201 and the jump series 303, and demonstrates how the maxima of the sequence 1301 correspond to jumps in the original signal 201. Hence, the jump points are found.

Figure 14:
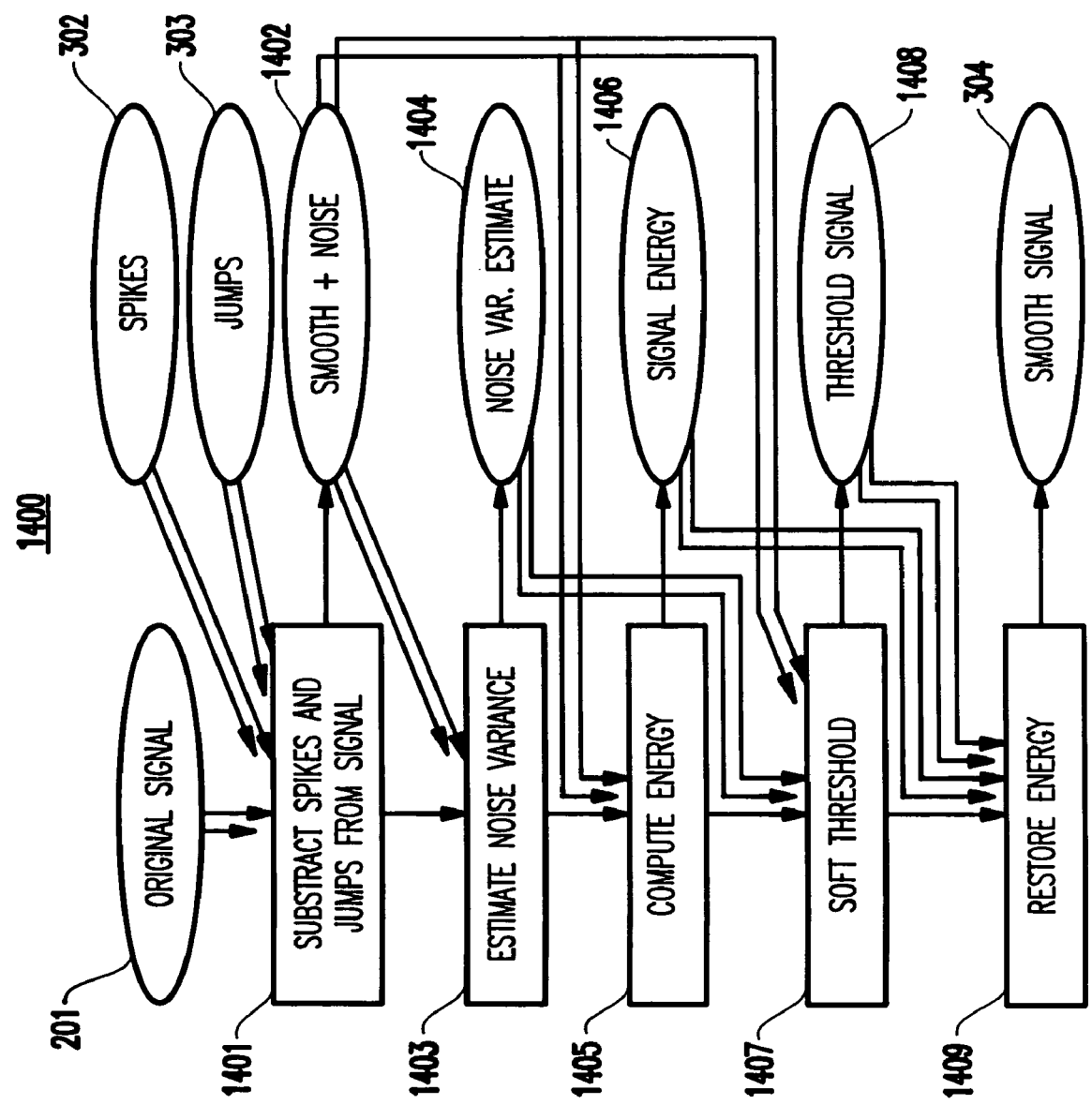
FIG. 14 illustrates an exemplary method for noise estimation and removal.

FIG. 14 depicts an example of a method 1400 of noise estimation and removal (e.g., step 507 described above in regard to FIG. 5).

In this embodiment, step 1401 takes as input the original signal 201, the spike series 302 and the jump series 303, and subtracts 302 and 303 from 201, thereby producing the sequence 1402 which contains the sum of the smooth signal 304 and of the noise sequence 301.

Step 1403 takes as input the sequence 1402 and estimates the variance of the noise 1404. In an exemplary embodiment, step 1403 includes the method 600 illustrated in FIG. 6. In this embodiment, the estimate 1404 is different from the estimate 502, which is obtained from the original signal 201 rather than from the sequence 1402.

In another embodiment, step 1403 is omitted and 1404 is taken to be equal to 502. Step 1405 computes the energy 1406 of the sequence 1402, by computing the sum of the squared of the values.

Step 1407 removes the noise from the sequence 1402, provided as input, using the estimate of the noise variance 1404. In the preferred embodiment shown in FIG. 14, step 1407 uses, a technique derived from the "soft thresholding"

method, taught by D. L. Donoho, "De-noising by soft-thresholding", *IEEE Trans. Information Theory*, 41(3), May, 1995, pp. 613–627.

In this preferred embodiment, step 1407 computes the wavelet transform of the sequence 1402, as described in FIG. 7. The coefficients of the transform (i.e., the values of the residual and detail sequences) are soft-thresholded using a threshold T that depends on the estimate of the noise variance. The soft-thresholding operation with threshold T applied to a value x is the operator S(x,T) defined as:

$$S(x,T)=x-T \text{ if } x>T,$$

$$S(x,T)=x+T \text{ if } x<-T,$$

$$S(x,T)=0 \text{ otherwise.} \quad (1)$$

The operation (1) is applied to all values of the residual and detail sequences of the transform. The inverse wavelet transform, described in FIG. 7, is then applied to the thresholded transform, and the thresholded signal 1408 is obtained. The soft-thresholding procedure 1407 has the property that it reduces the energy of the signal.

Step 1409 takes as input the thresholded signal 1408 and the energy 1406 of the signal 1402. It divides the energy 1406 by the energy of 1408, takes the square root, and multiplies by the result the signal 1408. The result is the smooth signal 304 which has the same energy as 1402. The noise is finally obtained by subtracting 304 from 1402.

At the end, a smooth version of the original signal is produced and input to a forecasting system/algorithm.

By the same token, depending upon what is desired to be forecast, each of the decomposed components (e.g., jumps, spikes, noise, etc.) can be directly input to the forecasting algorithm. For example, the noise may have a lot of information. In other words, if the noise is input and the noise variance grows beyond a predetermined limit over a predetermined time period, then this would indicate that some large problem is occurring. Similarly inputting the spikes would be informative. For example, when a situation occurs that the computer freezes because the operating system or the like is trying to correct/deal with an emergency situation, there may be a spike toward the bottom of the CPU utilization by the user processes. Such a spike could be correlated with all CPU utilization such that the spikes become more and more frequent, then this could be an indication that some problem is occurring with the operating system or the like.

Thus, depending upon the application (e.g., capacity management, software rejuvenation, etc.) and what type of variables are being monitored, any one or more (or all) of the decomposed components (sequences) could be employed.

While the overall methodology of the invention is described above, the invention can be embodied in any number of different types of systems and executed in any number of different ways, as would be known by one ordinarily skilled in the art taking the present application as a whole.

Figures 15, 16:
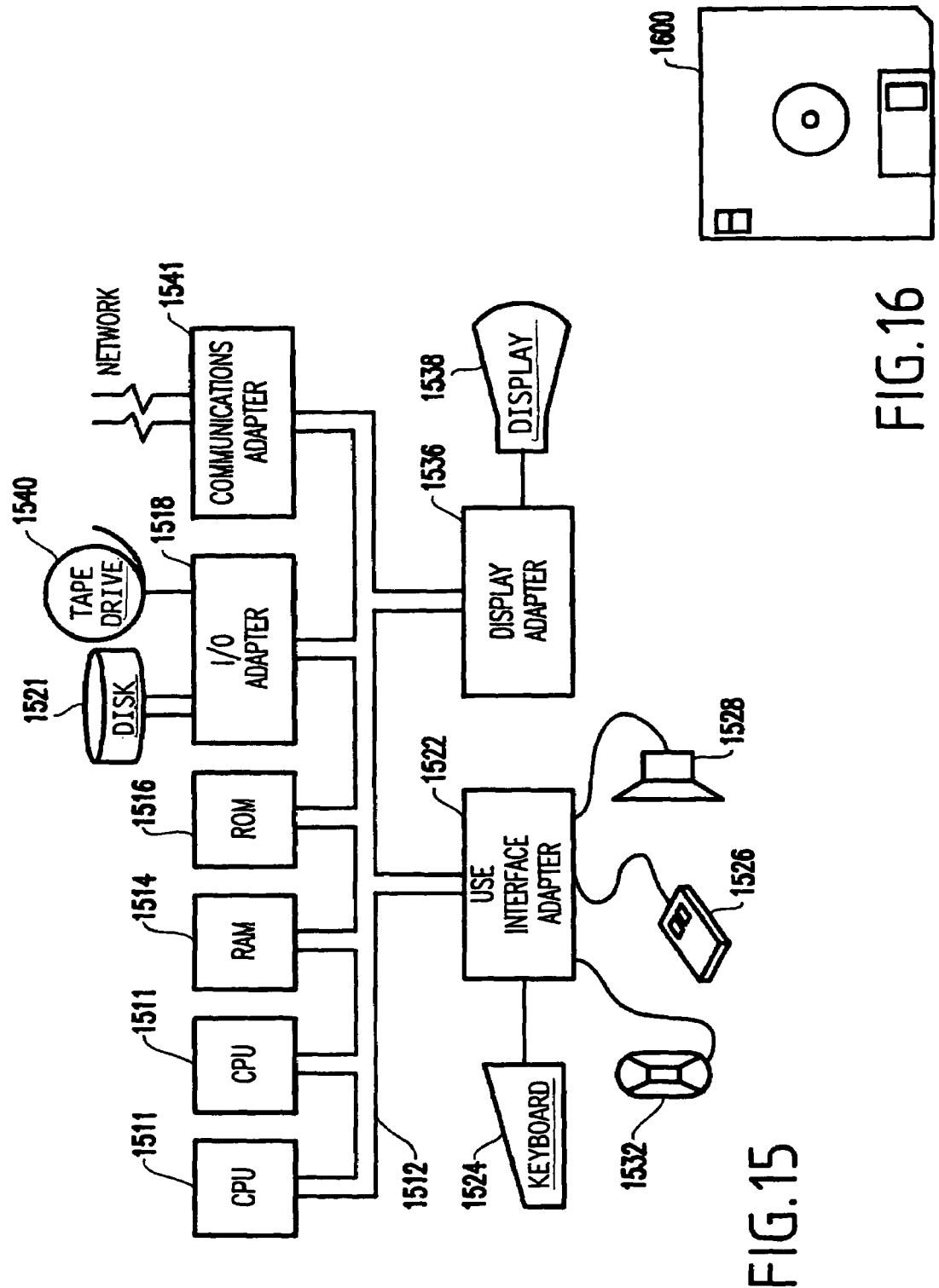
FIG. 15 illustrates an exemplary information handling/computer system for use with the present invention.
FIG. 16 illustrates a storage medium 1600 for storing steps of the program for the method according to the present invention.

For example, as illustrated in FIG. 15, a typical hardware configuration of an information handling/computer system for use with the invention. In accordance with the invention, preferably the system has at least one processor or central processing unit (CPU) 1511 and more preferably several CPUs 1511. The CPUs 1511 are interconnected via a system bus 1512 to a random access memory (RAM) 1514, read-only memory (ROM) 1516, input/output (I/O) adapter 1518 (for connecting peripheral devices such as disk units 1521 and tape drives 1540 to the bus 1512), user interface adapter 1522 (for connecting a keyboard 1524, an input device such as a mouse, trackball, joystick, touch screen, etc. 1526, speaker 1528, microphone 1532, and/or other user interface device to the bus 1512), communication adapter 1534 (for connecting the information handling system to a data processing network such as an intranet, the Internet (World-Wide-Web) etc.), and display adapter 1536 (for connecting the bus 1512 to a display device 1538). The display device could be a cathode ray tube (CRT), liquid crystal display (LCD), etc., as well as a hard-copy printer (e.g., such as a digital printer).

In addition to the hardware/software environment described above, a different aspect of the invention includes a computer-implemented method for performing the above operations. This method may be implemented in the particular environment discussed above.

Such a method may be implemented, for example, by operating the CPU 1511 (FIG. 15), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1511 and hardware above, to perform the above method.

This signal-bearing media may include, for example, a RAM (not shown in FIG. 15) contained within the CPU 1511 or auxiliary thereto as in RAM 1514, as represented by a fast-access storage for example. Alternatively, the instructions may be contained in another signal-bearing media, such as a magnetic data storage diskette 1600 (e.g., as shown in FIG. 16), directly or indirectly accessible by the CPU 1511.

Whether contained in the diskette 1600, the computer/CPU 1511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a method (and system) are provided in which in most scenarios, the data satisfies the assumptions, and the resulting prediction can be reliable, and with acceptable confidence intervals. Hence, the usefulness of the prediction made by the inventive method is significantly increased over the conventional methods.

While the invention has been described in terms of several preferred embodiments, those skilled in the art will recognize that the invention can be practiced with modification within the spirit and scope of the appended claims. For example, the invention can be especially beneficial for preprocessing economical data such as the price of financial instruments and of derivatives of financial instruments, and preprocessing data used for management of resources, such as monetary resources, inventories, and natural resources.

What is claimed is:

1. In a computer system where forecasting of computing resources is performed based on past and present observations of measurements related to said resources, a computer-implemented method for preprocessing including decomposing said past and present observations into a smooth time sequence, a jump time sequence, a noise time sequence and a spike time sequence, the computer-implemented method comprising:

detecting the spikes in a signal representing said measurements;

detecting the jumps in said signal;

removing spikes and jumps from said signal;

removing the noise from the signal, to obtain a smooth version of the signal, thereby to provide a basis for said forecasting of said computing resources by said computer system; and providing, by said computer system, said forecast based on said smooth version of the signal.

2. The method of claim 1, wherein the removing of the noise comprises:

estimating the variance of the noise.

3. The method of claim 2, further comprising:

estimating the variance of the noise prior to said detecting of said spikes.

4. The method of claim 1, further comprising:

estimating the variance of the noise prior to said detecting of said spikes.

5. The method of claim 1, wherein estimates of the quantities necessary to decompose the sequence are performed by first applying an invertible transform to the data associated with said observations.

6. The method of claim 5, wherein said transform comprises a discrete wavelet transform (DWT).

7. The method of claim 5, wherein said transform comprises a discrete fast Fourier transform.

8. The method of claim 6, further comprising estimating a variance of the noise using the coefficients of a highest frequency subband of the wavelet transform.

9. The method of claim 8, wherein the spikes are detected as up-and-down and down-and-up local variations, said spikes being judged not to be noise based on a result of a statistical test based on said estimating of the noise variance.

10. The method of claim 1, wherein said forecasting is for capacity management.

11. The method of claim 1, wherein said forecasting is for software rejuvenation.

12. The method of claim 1, wherein said forecasting is performed by estimating a trend of the smooth time sequence.

13. The method of claim 1, wherein seasonal components are removed from the smooth time sequence.

14. The method of claim 1, wherein seasonal components are separately removed from the smooth time sequence, the noise sequence, the spike sequence and the jump sequence.

15. The method of claim 1, wherein said forecasting is performed on each of said smooth time sequence, said jump time sequence, said noise time sequence, and said spike time sequence.

16. The method of claim 1, wherein said forecasting is performed on statistics of the jump time sequence, the noise time sequence and the spike time sequence.

17. The method of claim 1, wherein preprocessed data is based on the smooth version of the signal input to a forecasting algorithm for analyzing the preprocessed data, to produce a prediction.

18. The method of claim 1, wherein the signal is denoted by x, its value at time i by x(i), a sequence of values by $\{x(t)\}$, and a part of a sequence between times i and k by $\{x(i), \ldots, x(k)\}$, and wherein the noise represents unpredictable localized variations of the signal and is denoted by z, the spikes represent unpredictable localized up-and-down or down-and-up variations not judged to be noise, denoted by p, and the jumps are a zero-mean component, which is a piecewise constant other than at discontinuity points where the signal changes either upwards or downwards, but not in both directions, denoted by j, and the smooth time sequence is a difference between the signal and a sum of noise, spikes and jumps, denoted by y such that $$\{x(t)\}=\{z(t)+p(t)+j(t)+y(t)\}.$$

19. The method of claim 2, wherein the estimating of the variance of the noise includes:

computing a Discrete Wavelet Transform (DWT) of the signal;

extracting from the DWT a predetermined frequency subband depending upon a format of the DWT; and producing an initial noise variance based on said predetermined frequency subband.

20. The method of claim 19, further comprising correcting an initial estimate of the variance using the spike and the jump series extracted during a previous decomposition.

21. The method of claim 1, wherein said removing of said spikes comprises:

producing a Discrete Wavelet Transform (DWT) of the signal;

extracting a predetermined frequency band of the DWT; and identifying candidate locations of spikes based on a predetermined frequency band and a noise variance estimate.

22. The method of claim 21, wherein the identifying of candidate locations includes thresholding the predetermined frequency band with a threshold that depends on the estimate of the noise variance, such that each element of the predetermined frequency band having an absolute value larger than the threshold is declared a candidate location, and wherein the threshold is selected to discard the noise and to retain values not statistically defined by a noise process.

23. The method of claim 21, further comprising:

identifying actual individual spikes, wherein said identifying actual individual spikes comprises:

taking as inputs the signal and the estimated variance of the noise; and letting subscript i denote a location of a candidate spike and assuming that a spike of width w at location i is a sequence of (w+1) samples, $x_{i-1}, x_i, x_{i+1}$, such that a difference $d_1=(x_{i-1}-x_{i+1})$ is a sum variation in a smooth signal plus additive noise, and that the absolute value of a difference $d_2$ $[x_i-(x_{i-1}+x_{i+1})/2]$ is too large to be explained by a same model, computing the differences $d_1$ and $d_2$, and comparing the two differences to two thresholds $T_1$ and $T_2$, wherein if an absolute value of $d_1$ is less than $T_1$ and the absolute value of $d_2$ is larger than $T_2$, then the candidate spike is declared to be a spike.

24. The method of claim 1, wherein said detecting of said jumps comprises:

computing a Discrete Wavelet Transform (DWT) of the signal and producing a sequence of details obtained while computing the DWT, such that the details have a same length as the signal, wherein a collection of first k details plus the signal forms a (k+1)-level multi-resolution pyramid;

iterating over the (k+1) levels of the pyramid, such that at each said level a windowed linear regression is computed to produce a time series of slopes, wherein a time series of slopes is computed for the signal and a time series of slopes is computed for each of the details, such that in total (k+1) time series are produced, wherein said windowed linear regression uses a sliding window of width w, which takes as an input a time series $\{x(1), \ldots, x(n)\}$ and produces n−w+1 subseries $\{x(1), \ldots, x(w)\}, \{x(2), \ldots, x(w+1)\}, \ldots, \{x(n-w+1), \ldots, x(n)\}$ and a linear regression is computed for each of the subseries, by fitting a straight line segment to the data using a least squares criterion, and a slope sequence $\{s(1), \ldots, s(n-w+1)\}$ is generated.

25. The method of claim 24, wherein by applying windowing and segment fitting to each of the details a k+1 slope series of length n−w+1 is generated, said detecting of the jumps further comprising:
after all of the slope series are computed, computing a product of the slopes, wherein the jumps appear as extrema of the slopes at all the levels of the multi-resolution pyramid;
extracting local extrema and producing a list of candidate jump locations; and
removing extrema having a predetermined small absolute value and retaining extrema with a predetermined large absolute value, which are declared jumps.

26. The method of claim 1, wherein said noise removal comprises:
subtracting the spike series and the jump series from the signal, thereby producing a sequence which contains a sum of the smooth signal and the noise sequence;
based on the sequence, estimating a variance of the noise;
computing the energy of the sequence, by computing a sum of the squares of the values;
removing the noise from the sequence, and using the estimate of the noise variance by computing a wavelet transform of the sequence, wherein coefficients of the transform are soft-thresholded using a threshold T based on the estimate of the noise variance, and
wherein the soft-thresholding with threshold T applied to a value x is the operator S(x,T) defined as:

$S(x,T)=x-T$ if $x>T$, $S(x,T)=x+T$ if $x<-T$, $S(x,T)=0$ otherwise, (1)

wherein the operation (1) is applied to all values of the residual and detail sequences of the transform, and a thresholded signal is obtained;
restoring the energy by taking as inputs the thresholded signal and the energy of the signal, and dividing the energy by the energy of the thresholded signal, taking the square root, and multiplying the result by the thresholded signal, to produce the smooth signal having a same energy as a signal having the smooth and noise components; and
obtaining the noise by subtracting the smooth signal from the signal having the smooth and noise components.

27. The method of claim 1, where at least one of said computing resources is exhaustible.

28. A computer system, comprising:
a forecast module for forecasting computing resources based on observations of measurements related to said resources; and
a data preprocessing module for decomposing said observations into a smooth time sequence, a jump time sequence, a noise time sequence and a spike time sequence, wherein said data preprocessing module comprises:
an estimator for estimating a variance of the noise;
a detector for detecting the spikes and jumps in said estimated variance of the noise;
a subtractor for subtracting spikes and jumps from the signal, said estimator further estimating the variance of the noise of said signal based on said spikes and jumps having been removed, and said subtractor removing the noise, to obtain a smooth version of the signal, for input to said forecasting module to provide a basis for said forecasting of said computing resources by said forecasting module,
wherein said forecasting module provides said forecasting based on said smooth version of the signal.

29. A signal-bearing medium tangibly embodying a program of machine-readable instructions executable by a digital processing apparatus to perform a computer-implemented method for preprocessing data to be used for forecasting of computing resources based on observations of measurements related to said resources, said computer-implemented method for preprocessing including:
decomposing said observations into a smooth time sequence, a jump time sequence, a noise time sequence and a spike time sequence, said decomposing comprising:
detecting the spikes in a signal representing said measurements;
detecting the jumps in said signal;
removing spikes and jumps from said signal;
removing the noise from the signal, to obtain a smooth version of the signal, thereby to provide a basis for said forecasting of said computing resources by said digital data processing apparatus; and
providing, by said digital data processing apparatus, said forecast based on said smooth version of the signal.

30. In a computer system where forecasting of computing resources is performed based on past and present observations of measurements related to said resources, a computer-implemented method for preprocessing including decomposing said past and present observations into a smooth time sequence, a jump time sequence, a noise time sequence and a spike time sequence, the computer-implemented method comprising:
detecting the spikes in a signal representing said measurements;
detecting the jumps in said signal;
removing spikes and jumps from said signal;
removing the noise from the signal, to obtain a smooth version of the signal, thereby to provide a basis for said forecasting of said computing resources by said computer system; and
providing, by said computer system, said forecast based on said smooth version of the signal,
wherein at least one of said computing resources is exhaustible, and wherein the removing of the noise comprises:

estimating the variance of the noise prior to said detecting of said spikes, wherein estimates of the quantities necessary to decompose the sequence are performed by first applying an invertible transform to the data associated with said observations and wherein said transform comprises a discrete wavelet transform (DWT), wherein the estimating the variance comprises estimating a variance of the noise using the coefficients of a highest frequency subband of the wavelet transform, and wherein the spikes are detected as up-and-down and down-and-up local variations, said spikes being judged not to be noise based on a result of a statistical test based on said estimating of the noise variance, wherein said forecasting is performed by estimating a trend of the smooth time sequence, and wherein seasonal components are separately removed from the smooth time sequence, the noise sequence, the spike sequence and the jump sequence, and wherein said forecasting is performed on each of said smooth time sequence, said jump time sequence, said noise time sequence, and said spike time sequence.

* * * * *